No. 733,068. PATENTED JULY 7, 1903.
W. W. MITCHELL.
PESSARY.
APPLICATION FILED MAR. 26, 1902.
NO MODEL.

WITNESSES:
W. L. Bushong
T. E. Bryant

INVENTOR.
Wm. W. Mitchell
BY
V. H. Lockwood
ATTORNEY.

No. 733,068. Patented July 7, 1903.

UNITED STATES PATENT OFFICE.

WILLIAM W. MITCHELL, OF ANDERSON, INDIANA.

PESSARY.

SPECIFICATION forming part of Letters Patent No. 733,068, dated July 7, 1903.

Application filed March 26, 1902. Serial No. 100,111. (No model.)

*To all whom it may concern:*

Be it known that I, WILLIAM W. MITCHELL, of Anderson, county of Madison, and State of Indiana, have invented a certain new and useful Pessary; and I do hereby declare that the following is a full, clear, and exact description thereof, reference being had to the accompanying drawings, in which like numerals refer to like parts.

The object of this invention is to improve the construction and arrangement of pessaries, to render them more convenient and efficient in use, and especially to enable them to hold the medicine and to impart it slowly and gradually.

The nature of said invention will be understood from the accompanying drawings, showing one form of said invention, and the following description and claim.

Figure 1:
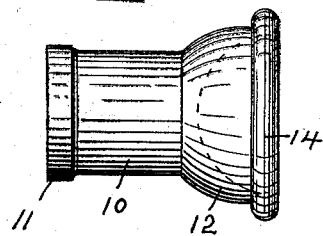
Figure 2:
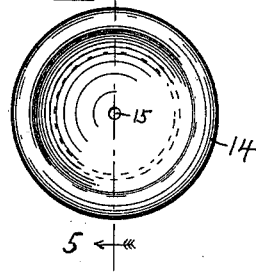
Figure 3:
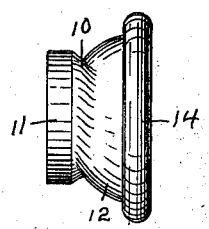
Figure 4:
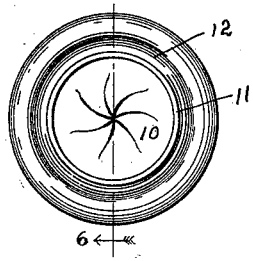
Figure 5:
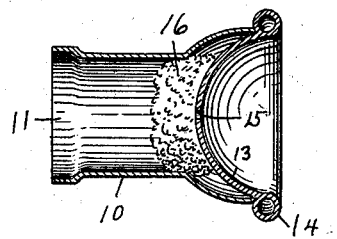
Figure 6:
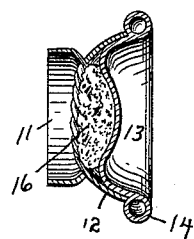

In the drawings, Figure 1 is an elevation of the pessary when not in use. Fig. 2 is a plan view of the same. Fig. 3 is an elevation of the device when collapsed in use. Fig. 4 is a bottom view of the same when collapsed. Fig. 5 is a central vertical section when not collapsed. Fig. 6 is a central vertical section when collapsed.

In said drawings I show practically a vessel made of rubber or like collapsible and preferably resilient material. Said vessel is cylindrical, with the lower end open and with the central portion 10 contracted and of slightly smaller diameter than the extreme lower portion 11, while the upper portion 12 is enlarged and flaring, somewhat like a funnel. The upper end 13 is closed and semispherical, with the concave side upward and the convex side extending into the cylindrical portion of the vessel. The rim of the bowl-shaped upper end is formed into an endless tube 14, that is air-tight and contains air. The function of the rim 14 is merely to distend the bowl-shaped upper end 13 of the vessel and hold it as nearly as possible while in use in the shape and position it is shown in the drawings. I do not wish, therefore, to limit the invention to a rim containing air; but that is preferable. In manufacture the bowl-shaped end 13 and the rim 14 are made together, while the remaining portion is together, and then the two parts united in the position shown in Fig. 5.

The bowl-shaped end 13 is perforated centrally at 15, and within the vessel a sponge 16, saturated with medicine, is placed against the convex side of the bowl-shaped end 13 and between it and the walls of the cylindrical portion of the vessel.

In use the cylindrical portion of the device is collapsible, thus compressing the sponge 16 and forcing some of the medicine therefrom through the perforation in the bowl-shaped end 13. To collapse the device, the end portion 11 is turned, thus twisting the central portion 10 and causing it to be drawn tightly down upon the spindle. The appearance when collapsed is shown in Figs. 3, 4, and 6. When thus collapsed, the medicine from the sponge cannot escape through the open end of the vessel.

The vessel is made of material that is impervious to fluids.

Instead of the sponge 16 any absorbent that will take up and impart fluid may be substituted.

What is claimed to be the invention, and to be secured by Letters Patent, is—

A pessary comprising a cylindrical vessel made of resilient material impervious to fluid with one end closed and extending inward and perforated and the other end open to permit the ready introduction of absorbent material, and with a rim on the open end which by rotation will cause the vessel to collapse both longitudinally and in cross-section, substantially as shown and described.

In witness whereof I have hereunto affixed my signature in the presence of the witnesses herein named.

WILLIAM W. MITCHELL.

Witnesses:
V. H. LOCKWOOD,
FLORENCE E. BRYANT.